(12) United States Patent
Craig (10) Patent No.: US 10,447,327 B2
(45) Date of Patent: Oct. 15, 2019

(54) ELECTRONIC DEVICE HOLSTER

(71) Applicant: Andrew Craig, Easton, PA (US)

(72) Inventor: Andrew Craig, Easton, PA (US)

( * ) Notice: Subject to any disclaimer, the term of this patent is extended or adjusted under 35 U.S.C. 154(b) by 0 days.

(21) Appl. No.: 15/974,839

(22) Filed: May 9, 2018

(65) Prior Publication Data

US 2018/0331708 A1    Nov. 15, 2018

Related U.S. Application Data

(60) Provisional application No. 62/504,062, filed on May 10, 2017.

(51) Int. Cl.
| A45F 5/02 | (2006.01) |
| H04B 1/3888 | (2015.01) |
| H04B 1/3827 | (2015.01) |
| A45C 11/00 | (2006.01) |

(52) U.S. Cl.
CPC ............. *H04B 1/3888* (2013.01); *A45F 5/02* (2013.01); *H04B 1/385* (2013.01); *A45C 2011/002* (2013.01); *A45F 2005/025* (2013.01); *A45F 2200/0516* (2013.01); *H04B 2001/3855* (2013.01)

(58) Field of Classification Search
CPC .......... H04B 1/3888; H04B 2001/3855; H04B 1/385; A45F 5/00; A45F 5/02; A45F 2005/025; A45F 2200/0516; A45C 2011/002
See application file for complete search history.

(56) References Cited

U.S. PATENT DOCUMENTS

| 4,569,465 | A | 2/1986 | O'Farrell |
| 5,244,023 | A | 9/1993 | Spies |
| 5,620,120 | A | 4/1997 | Tien |
| 5,833,100 | A | 11/1998 | Kim |
| 6,206,257 | B1 * | 3/2001 | Peele .................. A45F 5/02 224/197 |
| 6,454,146 | B2 | 9/2002 | Alis |
| D480,557 | S | 10/2003 | Kohli et al. |
| 6,665,524 | B1 | 12/2003 | Niemann |
| D486,304 | S | 2/2004 | Brown |
| 6,754,344 | B2 | 6/2004 | Kohli et al. |
| 6,880,737 | B2 | 4/2005 | Bauer |
| 6,955,279 | B1 | 10/2005 | Mudd et al. |
| 7,458,489 | B1 | 12/2008 | Mudd et al. |
| 8,073,131 | B2 | 12/2011 | Bodkin et al. |
| 8,308,033 | B2 | 11/2012 | Case et al. |
| D691,795 | S | 10/2013 | Do |
| 9,306,612 | B2 | 4/2016 | Forsythe |

(Continued)

*Primary Examiner* — Corey N Skurdal
(74) *Attorney, Agent, or Firm* — The Roy Gross Law Firm, LLC; Roy Gross (57) ABSTRACT

A method and system of and for releasably securing a personal electronic device to an article of clothing. A method and system of and for releasably securing a personal electronic device to an article of clothing including a holder or holster, and/or carrier for securing an electronics device to a person used during exercise and/or sports, performing manual labor, or other physical activity; and, including a corresponding rail or track system integrated into an article of clothing whereby an anchoring or attachment point may be releasably adjusted for ease of use and preferred placement of the device on the person of and by a user.

18 Claims, 7 Drawing Sheets

(56) References Cited

U.S. PATENT DOCUMENTS

| | | | |
|---|---|---|---|
| 9,560,435 B2 | 1/2017 | Richardson et al. | |
| 2007/0054555 A1* | 3/2007 | Yeh | A45F 5/00 439/607.05 |
| 2010/0171021 A1 | 7/2010 | Smith | |
| 2014/0305985 A1* | 10/2014 | Chang | A45F 5/021 224/676 |
| 2016/0058163 A1* | 3/2016 | Lee | A45F 5/00 224/267 |

* cited by examiner

ELECTRONIC DEVICE HOLSTER

CROSS-REFERENCE TO RELATED APPLICATIONS

This application claims priority to U.S. Provisional Patent Application No. 62/504,062 entitled ELECTRONIC DEVICE HOLSTER filed on May 10, 2017. The contents of this application are incorporated by reference in its entirety as if fully set forth herein.

FIELD OF THE INVENTION

The present invention relates to holders, holsters, and/or carriers for securing electronics devices to a person used during exercise and/or sports, performing manual labor, or other physical activity. More specifically, the present invention relates to holders, holsters, and/or carriers for securing electronic devices to a person which includes a rail or track system integrated into an article of clothing whereby an anchoring or attachment point may be releasably adjusted for ease of use and preferred placement of the device on the person of and by a user.

BACKGROUND OF THE INVENTION

Modernly, so-called "smart-phones" dominate the commercial personal telecommunications landscape. Such devices have become extremely sophisticated with large touch-screen interfaces and are capable of communication with other devices via networks such as WiFi, Bluetooth, and/or other proprietary cellular telephone and data networks and communication protocols. In daily life, to place telephone calls and communicate on intranets and/or the Internet, much of the modern world has access to and utilizes some type of cellular telecommunication and associated data system. Rarely, are the "well connected" of the world without such devices on their person.

Because of their high cost, preventing the inadvertent dropping of such a device, and the protecting a device when dropped, has become a priority for most users. Furthermore, when exercising with weights or working out in a gym, inadvertent dropping of the weights can result in the devices being damages from the weights and/or exercise movements of the individuals with weights.

Straps, holders, holsters, and other such systems for protecting and securing personal portable electronics devices are well known. Existing systems include: D480557, D486304, D691795, U.S. Pat. Nos. 4,569,465, 5,244,023, 5,620,120, 5,833,100, 6,454,146, 6,665,524, 6,754,344, 6,880,737, 6,955,279, 7,458,489, 8,073,131, 8,308,033, 9,306,612, 9,560,435, and US20100171021.

Disadvantageously however, during physical activity such as strenuous exercise, manual labor, or other similar endeavors, keeping "well connected" can at times be difficult. Typically, for example, a person practicing yoga, aerobics, cycling, or weight-lifting has difficulty keeping a smart-device on their person while still utilizing the device due to common and traditional wearing of specialized clothing. Such specialized clothing typically comprises flexible tight-fitting elastic or Spandex® type material which makes any included and used pocket in the clothing undesirable, as the "smart phone" located in the pocket often does not fit. Moreover, having a "smart phone" in a pocket causes the device interface screen to be inaccessible when placed in the pocket.

Attempting to overcome these disadvantages, upper arm bands or slings universally or specifically designed for an electronic device are known have been commercialized and are an alternative to placing a "smart phone" in a user's pocket. Such systems, however, are deficient and do not provide satisfactory capabilities for users to keep a user "well connected", as many systems require the electronic device be covered by clear protective covers that prohibit or disable the functionality of capacitive and/or inductive type touch-screen interfaces.

Thus, it is desired to provide a method and system that solves the disadvantages in the prior art.

SUMMARY OF THE INVENTION

It is an object of the present invention to provide a method and system of and for adjustably securing a "smart-phone" or other similar device to a person which allows for functional use of the device.

It is an object of the present invention to provide a method and system of and for adjustably securing a "smart-phone" or other similar device to a person which allows for functional use of the device, while the user is exercising or performing a physical or manual activity.

It is an object of the present invention to provide a method and system of and for adjustably securing a "smart-phone" or other similar device to a person which allows for functional use of the device, the method and system including a rail or track affixed to an article of clothing, and a cooperative device holster or holder.

It is an object of the present invention to provide a method and system of and for adjustably securing an electronic device, "smart-phone" or other similar device to a person which allows for functional use of the device; the method and system including a rail or track affixed to an article of clothing and a cooperative device holster or holder; wherein the device holster or holder may be locked into the track or rail at a selected position, and also capable of being releasably removed from the rail or track by the user.

It is an object of the present invention to provide a method and system of and for adjustably securing an electronic device, "smart-phone" or other similar device to a person which allows for functional use of the device, the method and system including rail or track affixed to an article of clothing and a cooperative device holster or holder, wherein the device holster or holder may freely travel along the track when the device holster or holder is in a first position, and wherein the device holster or holder is rotated in a second position, the device holster or holder is locked in place.

These and other objects of the invention are achieved by providing a system for securing a smart phone to a user, the system comprising: a rail member; and a device holster, the device holster configured to travel within the rail member, wherein when the device holster is in a first position, the device holster is configured to travel within the rail member, and wherein the device holster is in a second position, the device holster is locked into place within the rail member.

In certain embodiments, in the first position, the device holster is parallel to the rail member, and wherein in the second position, the device holster is perpendicular to the rail member.

In certain embodiments, in the first position, the device holster is perpendicular to the rail member, and wherein in the second position, the device holster is parallel to the rail member.

In certain embodiments, the first position involves the device holster being rotated approximately ninety degrees or approximately ninety degrees from the second position.

In certain embodiments, the rail member includes a base member, an upper rail member and a lower rail member, wherein the device holster is located between the upper rail member and the lower rail member.

In certain embodiments, the upper rail member includes a flange oriented parallel or approximately parallel to the base member, and the lower rail member includes a second flange oriented parallel or approximately parallel to the base member, the upper rail member and the lower rail member forming a channel, wherein the device holster travels within the channel.

In certain embodiments, the rail member is curved.

In certain embodiments, the device holster includes a removal mechanism, the removal mechanism configured to remove the holster device from the rail member.

In certain embodiments, the removal mechanism includes at least one actuator, the at least one actuator configured to release the holster device from the rail member.

In certain embodiments, the at least one actuator is a push member.

In certain embodiments, the removal mechanism includes two push members, wherein upon compression of the two push members towards one another, the device holster is released from the rail member.

In certain embodiments, the system includes a lock member, the lock member preventing the removal mechanism from being activated while the device holster travels within the rail member.

In certain embodiments, the rail member is affixed to an article of clothing.

In certain embodiments, the rail member is sewed into a polyester material that is 180 degrees around the leg of a user.

In certain embodiments, the polyester material includes elastic pants or sweatpants of a user.

In certain embodiments, the polyester material includes shorts of a user or pants that do not fully extend along the entire length of a user's leg.

In certain embodiments, the polyester material includes elastic pants of a sweatshirt, T-shirt, or any shirt worn by a user during a gym workout.

In certain embodiments, the device holder is configured to receive "smart-phone" devices selected from a group consisting of an iPhone®, iPad®, iPad Mini®, and Android based phones.

Other objects of the invention are achieved by providing a method for securing a smart phone to a user, the method comprising: providing a system including a rail member and a device holster, the device holster configured to travel within the rail member; affixing a "smart-phone" device within the device holder; attaching the device holster within the rail member; moving the device holster within the rail member; and rotating the device holster within the rail member to lock the device holster into place.

In certain embodiments, the system is configured to be attached to a user, while the user is exercising.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

In the following description, numerous details are set forth for the purpose of explanation. However, one of ordinary skill in the art will realize that the invention may be practiced without the use of these specific details.

The invention is directed to a method and system of and for adjustably securing an electronic device, "smart-phone" or other similar device to a person which allows for functional use of the device; the method and system including rail or track affixed to an article of clothing and a cooperative device holster or holder; wherein the device holster or holder may freely travel along the track when the device holster or holder is in a first position, and wherein the device holster or holder is rotated in a second position, the device holster or holder is locked in place.

In certain embodiments, the rotation between the first and second position is ninety degrees or approximately ninety degrees.

In certain embodiments, the inventive method and system comprises a rail or track that is solid and/or made of a solid or semi-solid material. In certain embodiments, the rail or track is made of a polymer or plastic.

In certain embodiments, the inventive method and system comprises a rail or track that is flexible.

In certain embodiments, the inventive method and system comprises a holder or holster that is solid and/or made of a solid or semi-solid material. In certain embodiments, the holder or holster is made of a polymer or plastic.

In certain embodiments, the inventive method and system comprises a or holder or holster that is flexible.

In certain embodiments, the track is sewed into a polyester material that is 180 degrees or approximately 180 degrees around the leg of a user.

In certain embodiments, the polyester material includes elastic pants of a user or sweatpants.

In certain embodiments, the polyester material includes shorts of a user or pants that do not fully extend along the entire length of a user's leg.

In certain embodiments, the polyester material includes elastic pants of a sweatshirt, T-shirt, or any shirt worn by a user during a gym workout.

In certain embodiments, the inventive method and system is capable of being used for multiple "smart-phone" devices including but not limited to iPhone(s), Samsung Phones, iPad, iPad Mini and other known and unknown portable electronic devices.

Figure 1A:
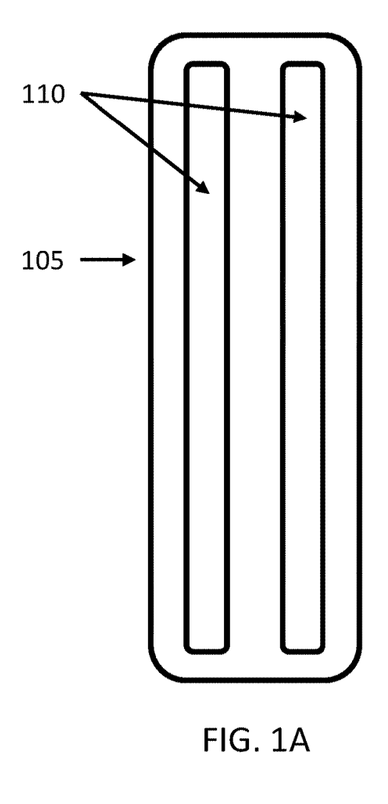
FIG. 1A is a top-view schematic diagram of an embodiment of the inventive system and method comprising a rail or track.
Figure 1B:
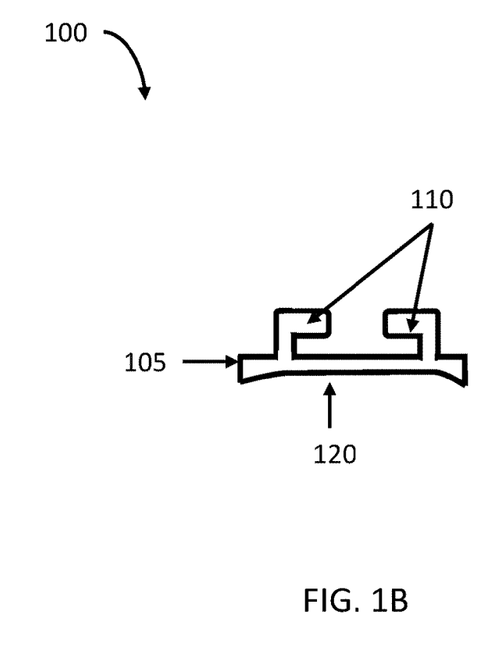
FIG. 1B is an end-view schematic diagram of an embodiment of the inventive system and method comprising a rail or track.

As depicted in FIGS. 1A and 1B, the instant inventive electronic device holster method and system (100) comprises at least one rail or track (105) including at least two opposing captive rails (110). The at least one rail or track (105) includes a base portion (120) supporting the at least two opposing captive rails (110). The at least two opposing captive rails (110) are oriented such that the rails (110) are parallel to the base portion (120).

Figure 2A:
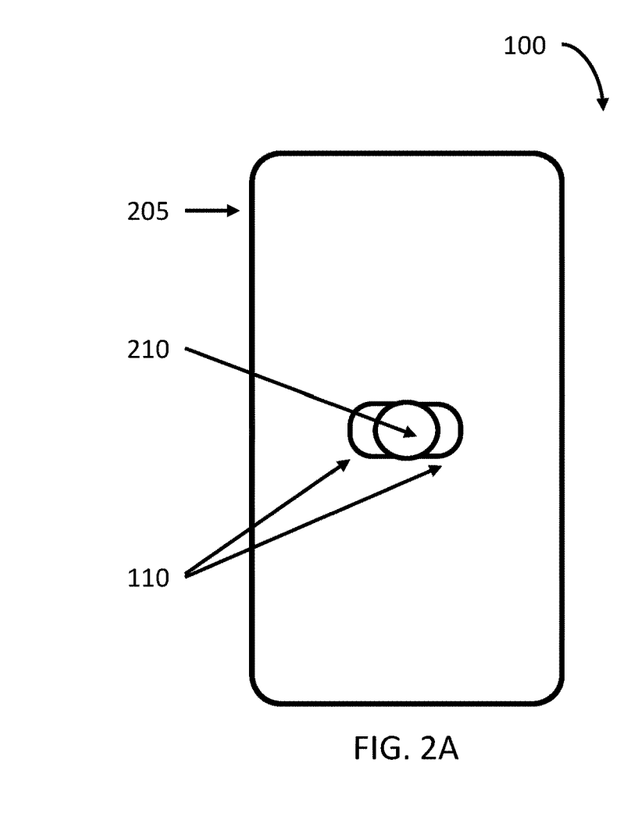
FIG. 2A is a rear or back-view schematic diagram of an embodiment of the inventive system and method comprising a "smart-device" holder or holster.

As depicted in FIG. 2A the instant inventive electronic device holster method and system (100) comprises at least one holder or holster (205) including a center post (210) and at least two opposing erratic fingers or flanges (215).

Figure 2B:
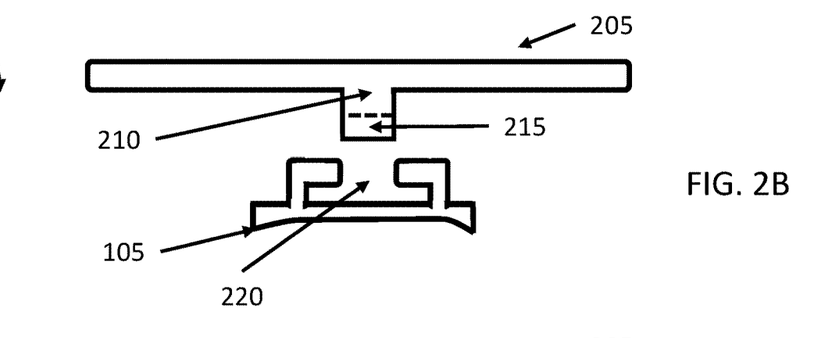
FIG. 2B is an end-view schematic diagram of an embodiment of the inventive system and method comprising the rail or track depicted in FIG. 1B, and the "smart-device" holder or holster depicted in FIG. 2A; prior to the holder or holster being inserted into the rail or track.
Figure 2C:
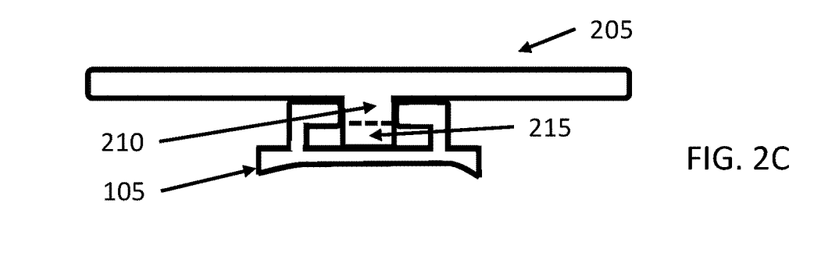
FIG. 2C is an end-view schematic diagram of an embodiment of the inventive system and method comprising the rail or track depicted in FIG. 1B, and the "smart-device" holder or holster depicted in FIG. 2A; wherein the holder or holster is inserted into the rail or track and is unlocked.

One dynamic theory of operation of the present embodiment may be as follows: As depicted in FIG. 2A, FIG. 2B, and FIG. 3A, it is contemplated that the at least one holder or holster (205) center post (210) and at least two opposing erratic fingers or flanges (215) is capable of insertion into an open trough (220) of the rail or track (105). It is further contemplated that the position of the at least two opposing erratic fingers or flanges (215) may be either perpendicular or parallel to the longitudinal axis of a corresponding rail or track (105) depending upon the desired final landscape or portrait orientation of an electronic device once locked. As depicted in FIGS. 2A-2D, if rail or track (105) is vertically affixed to an article of clothing, a user would hold the holder or holster (205) in a landscape orientation while inserting the center post (210) and the at least two opposing erratic fingers or flanges (215) into the open trough (220), as also depicted in FIG. 3A.

Figure 2D:
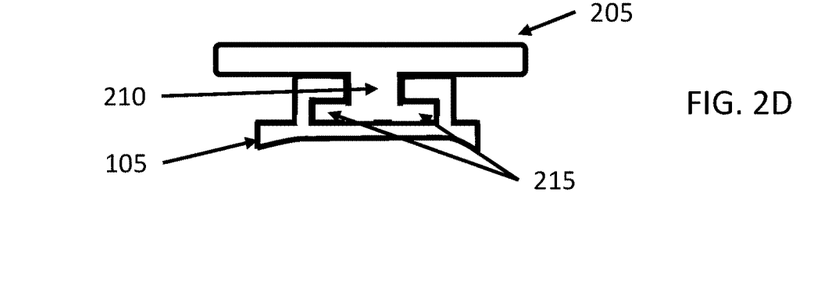
FIG. 2D is an end-view schematic diagram of an embodiment of the inventive system and method comprising the rail or track depicted in FIG. 1B, and the "smart-device" holder or holster depicted in FIG. 2A; wherein the holder or holster is inserted into the rail or track and is locked.
Figure 3A:
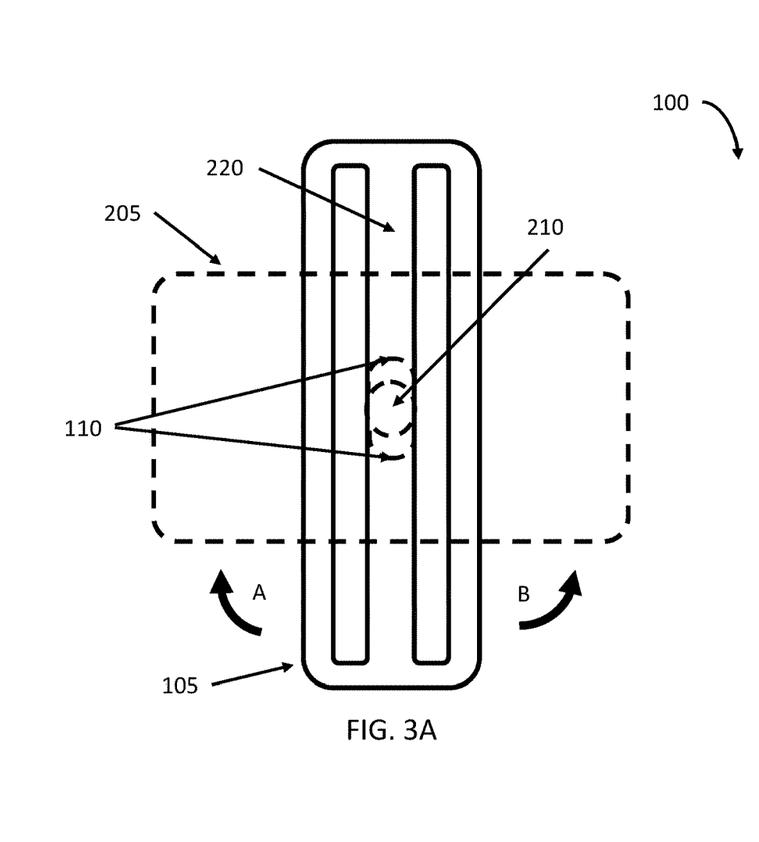
FIG. 3A is a top-view schematic diagram of an embodiment of the inventive system and method comprising the rail or track depicted in FIG. 1B, and the "smart-device" holder or holster depicted in FIG. 2A; wherein the holder or holster is inserted into the rail or track and is unlocked.
Figure 3B:
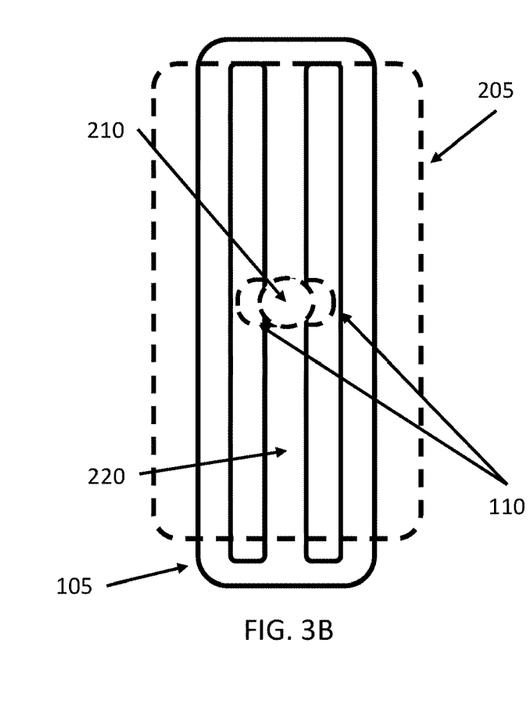
FIG. 3B is a top-view schematic diagram of an embodiment of the inventive system and method comprising the rail or track depicted in FIG. 1A, and the "smart-device" holder or holster depicted in FIG. 2A; wherein the holder or holster is inserted into the rail or track and is locked in a portrait orientation.
Figure 4A:
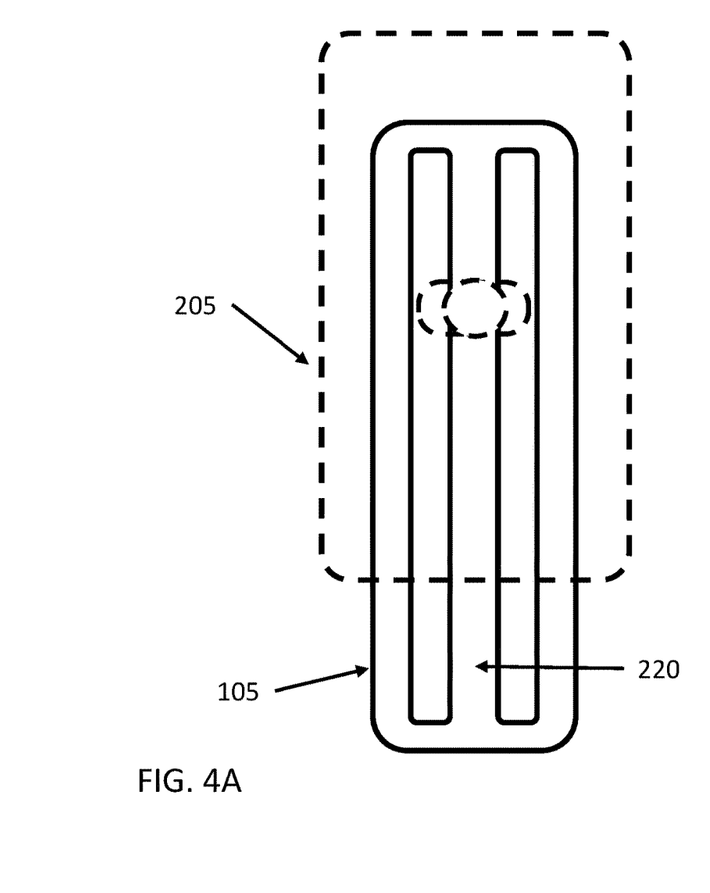
FIG. 4A is an end-view schematic diagram of an embodiment of the inventive system and method comprising the rail or track depicted in FIG. 1A, and the "smart-device" holder or holster depicted in FIG. 2A; wherein the holder or holster is inserted into the rail or track and is locked in a position toward the upper part of the rail or track.
Figure 4B:
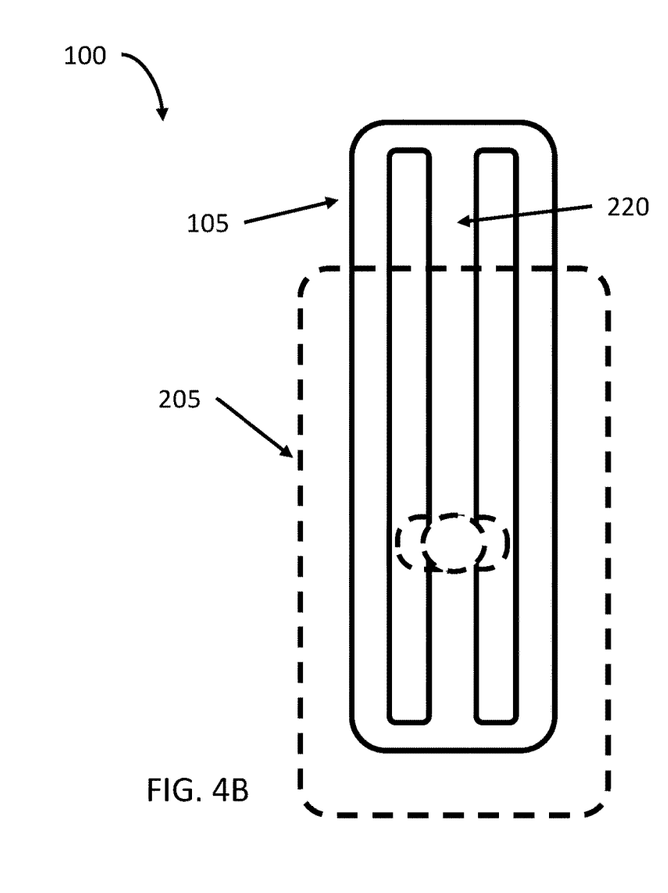
FIG. 4B is an end-view schematic diagram of an embodiment of the inventive system and method comprising the rail or track depicted in FIG. 1A, and the "smart-device" holder or holster depicted in FIG. 2A; wherein the holder or holster is inserted into the rail or track and is locked in a position toward the upper part of the rail or track.

As depicted in FIG. 2D and FIG. 3B, depending on the position along the rail or track (105) selected, a user of the system would then rotate the holder or holster (205) approximately ninety degrees about the center post (210) (as depicted by FIG. 3A, Arrow A or B) to engage or lock the at least two opposing erratic fingers or flanges (215) into and/or beneath the at least two opposing captive rails (110), thereby releasably and yet securely locking a personal electronic device at a desired location on the rail or track (105) in a portrait orientation in accordance with the placement of the at least two opposing erratic fingers or flanges (215) about center post (210) as depicted in FIGS. 4A and 4B.

Figure 5A:
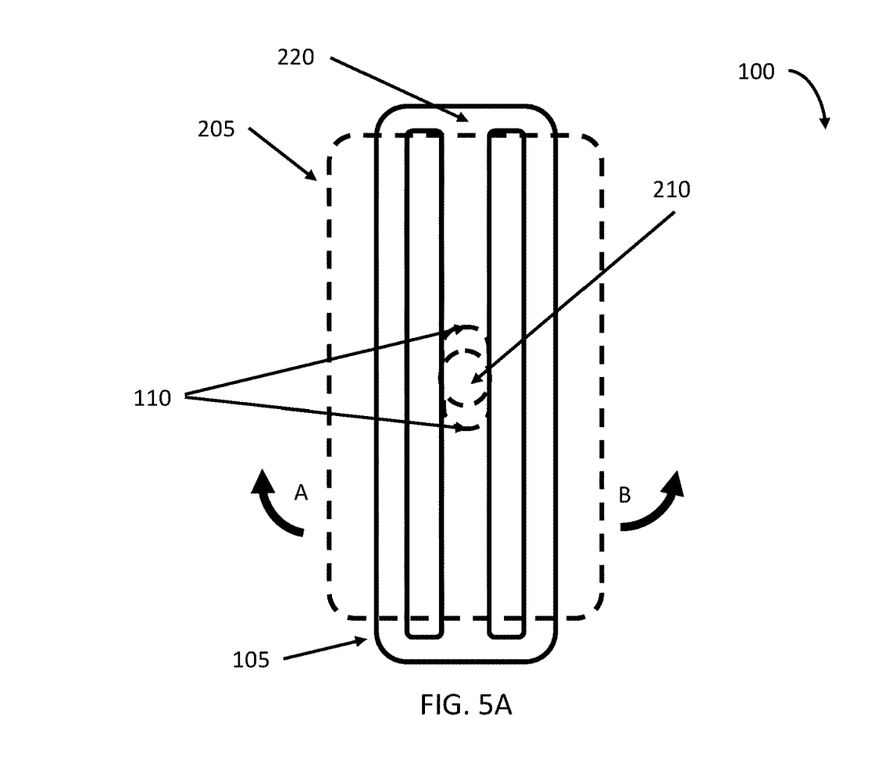
FIG. 5A is a top-view schematic diagram of an embodiment of the inventive system and method comprising the rail or track depicted in FIG. 1B, and the "smart-device" holder or holster depicted in FIG. 2A; wherein the holder or holster is inserted into the rail or track and is unlocked.
Figure 5B:
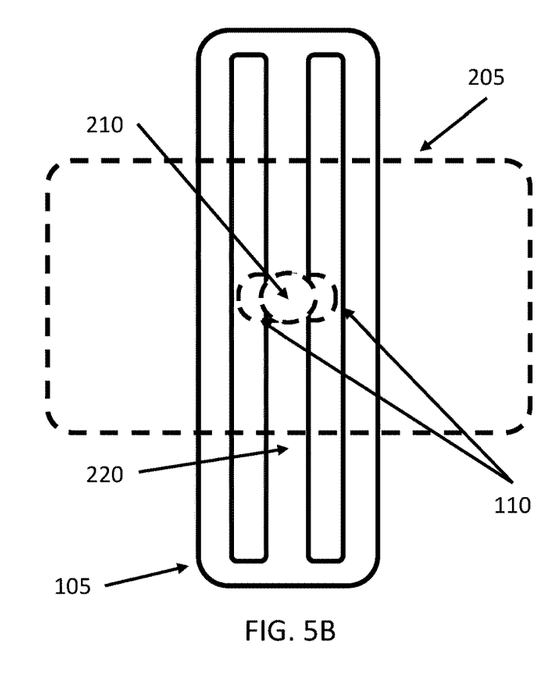
FIG. 5B is a top-view schematic diagram of an embodiment of the inventive system and method comprising the rail or track depicted in FIG. 1A, and the "smart-device" holder or holster depicted in FIG. 2A; wherein the holder or holster is inserted into the rail or track and is locked in a landscape orientation.

Similarly, as depicted in FIGS. 5A and 5B, if rail or track (105) is vertically affixed to an article of clothing, a user would hold the holder or holster (205) in a portrait orientation while inserting the center post (210) and the at least two opposing erratic fingers or flanges (215) into the open trough (220), and in accordance with the placement of the at least two opposing erratic fingers or flanges (215) about center post (210), a user would rotate the holder or holster (205) approximately ninety degrees about the center post (210) (as depicted by FIG. 5A, Arrow A or B) to engage or lock the at least two opposing erratic fingers or flanges (215) into and/or beneath the at least two opposing captive rails (110), thereby releasably and yet securely locking a personal electronic device in a landscape orientation at a desired location on the rail or track (105).

Figure 6A:
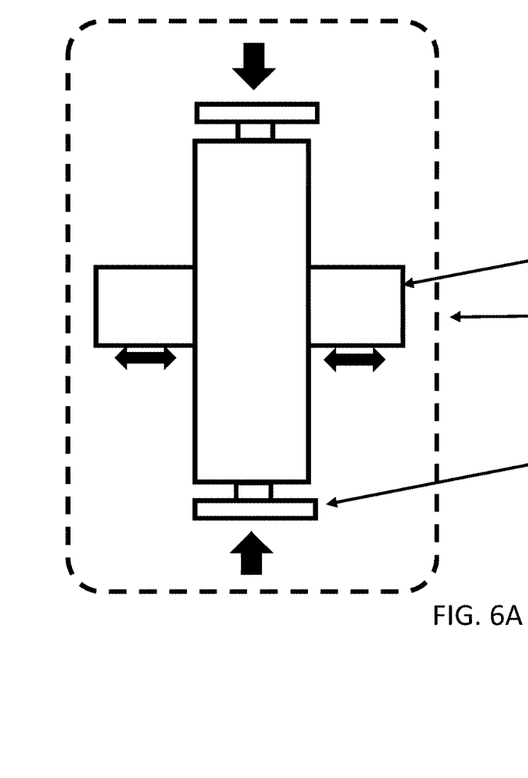
FIG. 6A is a top-view schematic diagram of a holder or holster of an embodiment of the invention depicted in FIG. 2A; wherein the "center post" actuator is enlarged for clarity.
Figure 6B:
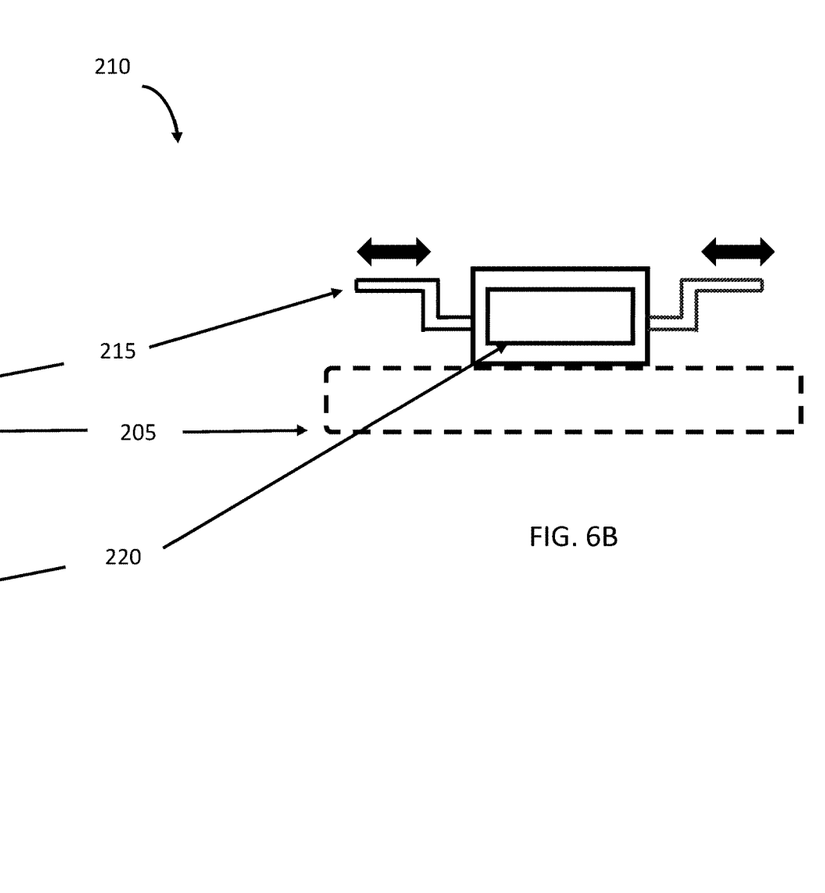
FIG. 6B is a side perspective view of a holder or holster of an embodiment of the invention depicted in FIG. 2A; wherein the "center post" actuator is enlarged for clarity.

The dynamic theory of operation for the actuator that switches between locked and unlocked may be as follows: As depicted in FIGS. 6A and 6B, the actuator relies on at least one button (220) that when pressed will move the erratic fingers or flanges (215) between a locked (secure) and unlocked (unsecure) position within the rail or track.

Figure 7:
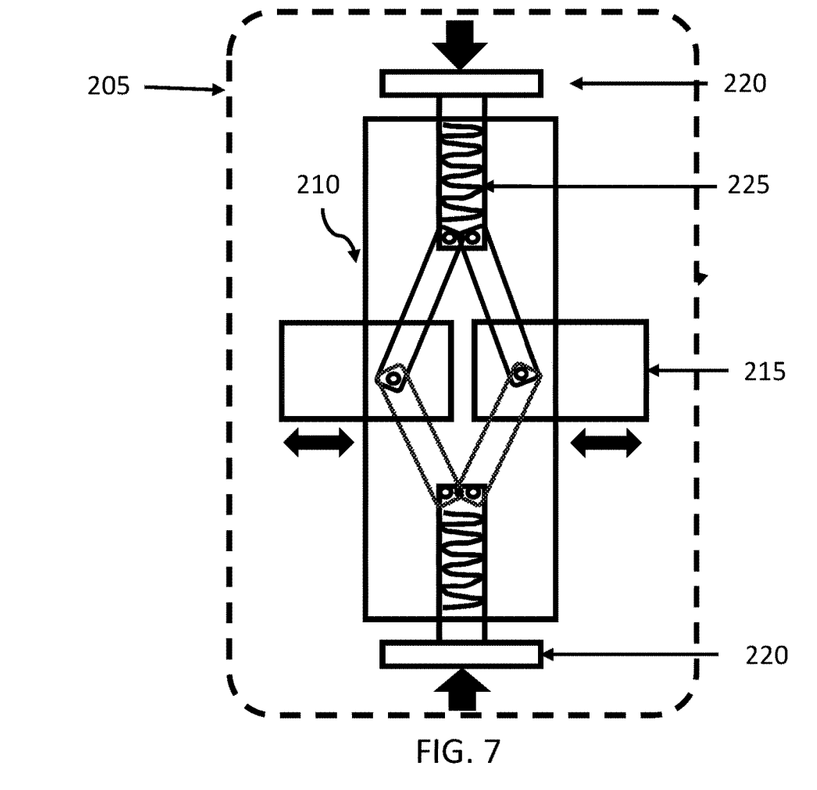
FIG. 7 is a top-view schematic diagram of a holder or holster of an embodiment of the invention depicted in FIG. 2A; wherein the "center post" actuator is enlarged for clarity and the inner components revealed.

As depicted in FIG. 7, it is contemplated that the erratic fingers or flanges of the "center post" actuator (220) may be semi-permanently held in the locked (secure) position with a spring (225), or magnet, or other means of applying tension.

It is contemplated that a rail or track (105) may be affixed to an article of clothing either vertically, horizontally, or diagonally depending upon the desires of a user. For example, an article of clothing intended to be worn during typically physical exercise, a rail or track (105) may be affixed vertically along the upper thigh and/or upper arm; and if an article of clothing such as a Law Enforcement, Corrections, Security, or Military uniform or fatigues, a rail or track (105) may be horizontally affixed to the upper chest or clavicle area of a user.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

The invention claimed is:

1. A system for securing a smart phone to a user, the system comprising:
    a rail member; and
    a device holster, the device holster configured to travel within the rail member, wherein when the device holster is in a first position, the device holster is configured to travel within the rail member, and
    wherein the device holster is in a second position, the device holster is locked into place within the rail member,
    wherein the device holster includes a removal mechanism, the removal mechanism configured to remove the holster device from the rail member,
    wherein the removal mechanism includes at least one actuator, the at least one actuator configured to release the holster device from the rail member, and
    wherein the at least one actuator is a push member.

2. The system of claim 1, wherein in the first position, the device holster is parallel to the rail member, and wherein in the second position, the device holster is perpendicular to the rail member.

3. The system of claim 1, wherein in the first position, the device holster is perpendicular to the rail member, and wherein in the second position, the device holster is parallel to the rail member.

4. The system of claim 1, wherein the first position involves the device holster being rotated approximately ninety degrees or approximately ninety degrees from the second position.

5. The system of claim 1, wherein the rail member includes a base member, an upper rail member and a lower rail member, wherein the device holster is located between the upper rail member and the lower rail member.

6. The system of claim 5, wherein the upper rail member includes a flange oriented parallel or approximately parallel to the base member, and the lower rail member includes a second flange oriented parallel or approximately parallel to the base member, the upper rail member and the lower rail member forming a channel, wherein the device holster travels within the channel.

7. The system of claim 1, wherein the rail member is curved.

8. The system of claim 1 wherein the removal mechanism includes two push members, wherein upon compression of the two push members towards one another, the device holster is released from the rail member.

9. The system of claim 1 wherein the system includes a lock member, the lock member preventing the removal mechanism from being activated while the device holster travels within the rail member.

10. The system of claim 1, wherein the rail member is configured to be affixed to an article of clothing.

11. The system of claim 1, wherein the device holder is configured to receive "smart-phone" devices selected from a group consisting of an iPhone®, iPad®, iPad Mini®, and Android based phones.

12. A system for securing a smart phone to a user, the system comprising:
    a rail member; and
    a device holster, the device holster configured to travel within the rail member,
    wherein when the device holster is in a first position, the device holster is configured to travel within the rail member, and
    wherein the device holster is in a second position, the device holster is locked into place within the rail member,
    wherein the rail member is configured to be sewed into a polyester material that is 180 degrees around the leg of a user.

13. The system of claim 12, wherein the polyester material includes elastic pants or sweatpants of a user.

14. The system of claim 12, wherein the polyester material includes shorts of a user or pants that do not fully extend along the entire length of a user's leg.

15. The system of claim 12, wherein the polyester material includes elastic pants of a sweatshirt, T-shirt, or any shirt worn by a user during a gym workout.

16. A method for securing a smart phone to a user, the method comprising:
    providing a system according to claim 1;
    affixing a "smart-phone" device within the device holder;
    attaching the device holster within the rail member;
    moving the device holster within the rail member; and
    rotating the device holster within the rail member to lock the device holster into place.

17. The method of claim 16, wherein the system is configured to be attached to a user, while the user is exercising.

18. A method for securing a smart phone to a user, the method comprising:
    providing a system according to claim 12;
    affixing a "smart-phone" device within the device holder;
    attaching the device holster within the rail member;
    moving the device holster within the rail member; and
    rotating the device holster within the rail member to lock the device holster into place.

* * * * *